(12) United States Patent
Maruyama (10) Patent No.: US 11,317,073 B2
(45) Date of Patent: Apr. 26, 2022

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Kazuna Maruyama, Fuchu (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/562,772

(22) Filed: Sep. 6, 2019

(65) Prior Publication Data
US 2020/0084426 A1 Mar. 12, 2020

(30) Foreign Application Priority Data

Sep. 12, 2018 (JP) .............................. JP2018-170895

(51) Int. Cl.
*H04N 13/117* (2018.01)
*G06T 7/70* (2017.01)
(Continued)

(52) U.S. Cl.
CPC ............. *H04N 13/117* (2018.05); *G06T 7/70* (2017.01); *H04N 5/247* (2013.01); *H04N 13/167* (2018.05)

(58) Field of Classification Search
CPC .... H04N 13/117; H04N 5/247; H04N 13/167; H04N 13/111; H04N 13/243;
(Continued)

(56) References Cited

U.S. PATENT DOCUMENTS 9,497,380 B1 * 11/2016 Jannard ................ H04N 5/2254
10,535,190 B2 * 1/2020 Logan ..................... G06T 13/40
(Continued)

FOREIGN PATENT DOCUMENTS

JP 2006185648 A * 7/2006 ............... G06T 1/00
JP 2008015756 A 1/2008

OTHER PUBLICATIONS

Naho Inamoto et al., "Virtual Viewpoint Reply for a Soccer Match By View Interpolation From Multiple Cameras" IEEE, Oct. 2007 (Year: 2007).*

(Continued)

*Primary Examiner* — Dramos Kalapodas
(74) *Attorney, Agent, or Firm* — Rossi, Kimms & McDowell LLP (57) ABSTRACT

An information processing apparatus comprises an identification unit configured to identify a position and an orientation of an image capturing apparatus; a reception unit configured to receive an input associated with a switching operation for switching an image to be output between a captured image acquired by the image capturing apparatus and a virtual viewpoint image generated based on a plurality of captured images captured from different directions; and a determination unit configured to determine a position and an orientation of a virtual viewpoint corresponding to the virtual viewpoint image such that, in a specific period after the input associated with the switching operation is received, the position and the orientation of the virtual viewpoint and the identified position and the identified orientation of the image capturing apparatus match each other.

15 Claims, 9 Drawing Sheets

(51) Int. Cl.
*H04N 5/247* (2006.01)
*H04N 13/167* (2018.01)

(58) Field of Classification Search
CPC ........ H04N 5/296; H04N 13/282; G06T 7/70;
G06T 7/73; G06T 7/85; G06T 7/74;
G05D 1/0094; B64C 39/034; B64D
47/08; G09G 5/00
See application file for complete search history.

(56) References Cited

U.S. PATENT DOCUMENTS

| | | | | |
|---|---|---|---|---|
| 10,790,915 B2* | 9/2020 | DaSilva | ................ | H01Q 3/267 |
| 2005/0018045 A1* | 1/2005 | Thomas | ................ | G06K 9/209 |
| | | | | 348/157 |
| 2005/0163343 A1* | 7/2005 | Kakinami | .......... | G06K 9/00812 |
| | | | | 382/103 |
| 2013/0057574 A1* | 3/2013 | Shimizu | ................ | G06T 15/20 |
| | | | | 345/619 |
| 2013/0322844 A1* | 12/2013 | Suzuki | ............... | G06F 3/04815 |
| | | | | 386/230 |
| 2018/0316906 A1* | 11/2018 | Nobori | ...................... | G06T 7/85 |
| 2019/0206128 A1* | 7/2019 | Logan | ................... | G06T 15/205 |
| 2019/0356905 A1* | 11/2019 | Godard | .................... | G06T 7/73 |
| 2020/0027242 A1* | 1/2020 | Koyama | ................... | G06T 7/70 |
| 2020/0034989 A1* | 1/2020 | Koyama | ................ | H04N 5/232 |
| 2020/0242840 A1* | 7/2020 | Logan | ................... | G06T 19/003 |
| 2020/0389640 A1* | 12/2020 | Lee | ...................... | H04N 13/117 |

OTHER PUBLICATIONS

Naho Inamoto et al., "Virtual Viewpoint Replay From a Soccer Match By View Interpolation From Multiple Cameras", 1520-9210 (C) 2007 IEEE (Year: 2017).*

* cited by examiner

INFORMATION PROCESSING APPARATUS, METHOD OF CONTROLLING INFORMATION PROCESSING APPARATUS, AND STORAGE MEDIUM

BACKGROUND OF THE INVENTION

Field of the Invention

The present invention relates to an information processing apparatus, a method of controlling the information processing apparatus, and a storage medium.

Description of the Related Art

A technique has attracted attention in which a plurality of cameras are installed at different positions to synchronously capture videos by multiple viewpoints, and generate virtual viewpoint videos with use of the multi-viewpoint videos acquired by the capturing. Such a technique of generating virtual viewpoint videos from multi-viewpoint videos allows for viewing a highlight scene in soccer, basketball and the like from various angles, for example, and thus a higher realistic sensation as compared to a normal video can be given to a viewer.

Japanese Patent Laid-Open No. 2008-015756 discloses a technique in which a plurality of cameras is arranged so as to surround a subject, and a virtual camera video at any viewpoints is generated using images of the subject captured by the plurality of cameras.

When an event such as a soccer game captured by multi-viewpoint synchronous capturing is also captured with an actual camera such as a broadcasting camera, a combination of the virtual camera video and the actual camera video can be relayed by the television or distributed through the Internet. For example, it is possible to create a goal scene in which a virtual camera video of a viewpoint of a goalkeeper of an incoming ball passing by their side is switched to an actual camera video zooming up on facial expressions of the goalkeeper and the kicker. In this manner, by adding virtual camera videos that cannot be captured by an actual camera, such as the viewpoint of the goalkeeper or a bird's-eye view, to a conventional actual camera video, an experience of more realistic videos can be provided to a viewer.

However, depending on the switching method between the virtual camera video and the actual camera video and the moving method of the virtual camera, the viewer may be confused by losing the direction and location in and from which the videos have been captured.

SUMMARY OF THE INVENTION

According to one aspect of the present invention, there is provided an information processing apparatus comprising: an identification unit configured to identify a position and an orientation of an image capturing apparatus; a reception unit configured to receive an input associated with a switching operation for switching an image to be output between a captured image acquired by the image capturing apparatus and a virtual viewpoint image generated based on a plurality of captured images captured from different directions; and a determination unit configured to determine a position and an orientation of a virtual viewpoint corresponding to the virtual viewpoint image such that, in a specific period after the input associated with the switching operation is received, the position and the orientation of the virtual viewpoint and the identified position and the identified orientation of the image capturing apparatus match each other.

Further features of the present invention will be apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Configurations of Video Processing System and Information Processing Apparatus

Figure 1A:
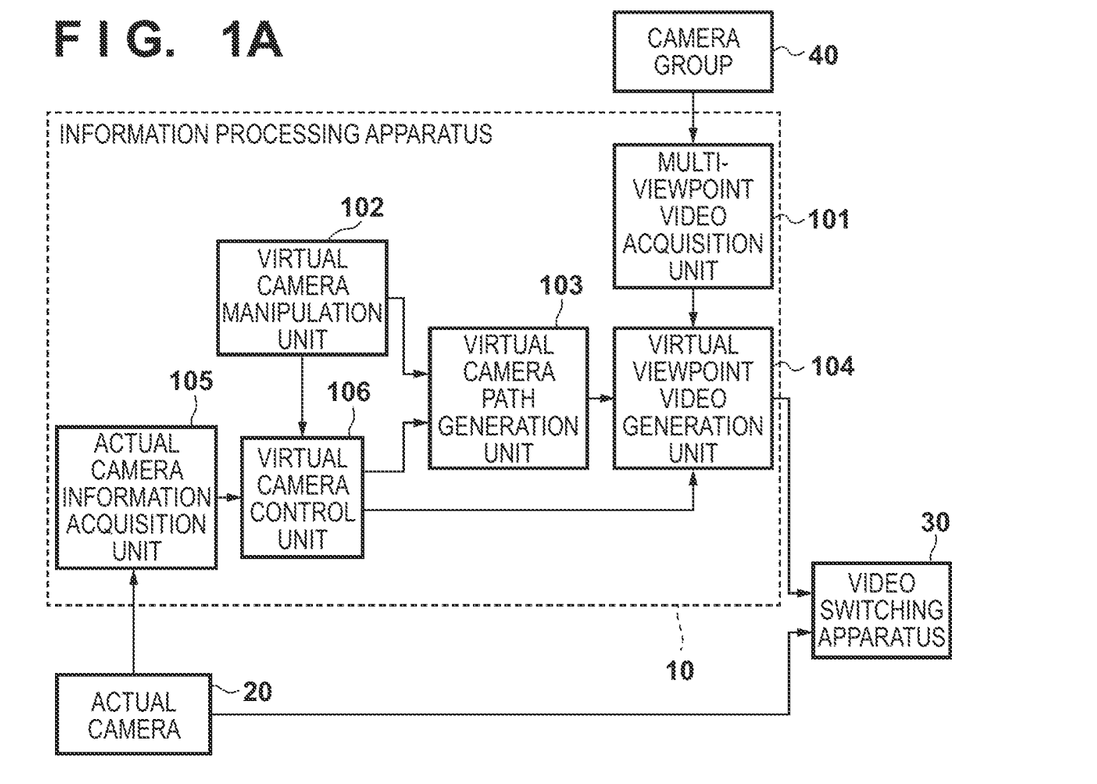
FIG. 1A is an overall configuration diagram of a video processing system according to a first embodiment.

FIG. 1A is an overall configuration diagram of a video processing system according to a first embodiment. The video processing system includes an information processing apparatus 10, an actual camera (image capturing apparatus) 20, a video switching apparatus 30, and a camera group 40.

The information processing apparatus 10 includes a multi-viewpoint video acquisition unit 101, a virtual camera manipulation unit 102, a virtual camera path generation unit 103, a virtual viewpoint video generation unit 104, an actual camera information acquisition unit 105, and a virtual camera control unit 106. The functions of the processing units are achieved by reading and executing a computer program with a controller such as a CPU described later with reference to FIG. 1B.

The multi-viewpoint video acquisition unit 101 acquires a multi-viewpoint video (multi-viewpoint video) synchronously captured with the camera group 40 composed of a plurality of cameras installed to surround a sports field or the like. The acquired multi-viewpoint video is output to the virtual viewpoint video generation unit 104.

The virtual camera manipulation unit 102 controls a virtual camera on the basis of manipulation performed by a virtual camera operator, and outputs a control result to the virtual camera path generation unit 103 and the virtual camera control unit 106 as virtual camera parameters. Here, the virtual camera parameters are information including at least parameters relating to the position and posture (orientation) of the virtual camera. The virtual camera parameters may further include a parameter relating to the angle of view. The virtual camera operator controls the position and posture of the virtual camera with use of an input device such as a joystick, and controls the angle of view of the virtual camera with use of an input device such as a slider. Alternatively, the virtual camera may be controlled by directly designating the virtual camera parameters with use of an input device such as a touch panel and a keyboard.

In addition, the virtual camera manipulation unit 102 outputs a switching request notification and a switching execution notification of the actual camera and the virtual camera to the virtual camera control unit 106. Here, the switching request notification is a notification indicating that switching from the actual camera video to the virtual camera video or switching from the virtual camera video to the actual camera video has been requested. The switching request notification is provided when a virtual camera operator who has received a switching instruction from a director or the like via a headset or the like presses a button displayed on the touch panel screen, or the like. In addition, the switching execution notification is a notification indicating completion of a switching operation, and is provided when the virtual camera operator who has recognized that switching in accordance with a switching request has been performed in the video switching apparatus 30 presses a button displayed on the touch panel, or the like. The actual camera video in the present embodiment is a captured image acquired by the actual camera 20, and the virtual camera video is a virtual viewpoint image generated based on a plurality of captured images captured from different directions with the camera group 40.

The virtual camera path generation unit 103 acquires a virtual camera parameter from the virtual camera manipulation unit 102 and the virtual camera control unit 106, generates a virtual camera path, and outputs it to the virtual viewpoint video generation unit 104. Here, the virtual camera path is a collection of multiple virtual camera parameters that are continuous in time. The virtual camera path generation unit 103 associates the virtual camera parameters with frame numbers and/or timecodes so that the correspondence between the frame and the virtual camera parameter can be identified when generating the virtual camera path. The virtual camera path generation unit 103 acquires on/off information of an automatic manipulation mode from the virtual camera control unit 106. When the automatic manipulation mode is on, the virtual camera parameter acquired from the virtual camera control unit 106 is used to generate the virtual camera path. When the automatic manipulation mode is off, the virtual camera parameter acquired from the virtual camera manipulation unit 102 is used to generate the virtual camera path. The virtual camera is controlled in accordance with a virtual camera parameter determined in accordance with the manipulation of the virtual camera performed by the operator until it transitions to the automatic manipulation mode in response to a switching operation performed by the operator. In addition, the virtual camera is controlled in accordance with a virtual camera parameter determined under the automatic manipulation mode until the automatic manipulation mode is transitioned to off in response to a switching operation performed by the operator.

The virtual viewpoint video generation unit 104 generates a virtual viewpoint video by generating a three-dimensional model from the multi-viewpoint video acquired by the multi-viewpoint video acquisition unit 101 and by mapping the texture in the virtual viewpoint of the virtual camera path generated by the virtual camera path generation unit 103. The virtual viewpoint video generation unit 104 receives information on the target image quality at the time of switching from the virtual camera control unit 106, and changes the image quality of the virtual viewpoint image to be generated in accordance with the target image quality. Here, the target image quality is, for example, a minimum display size $x_{vmin}$ multiplied by a coefficient. The minimum display size $x_{vmin}$ is obtained when a reference object located at a position separated by a reference distance from a virtual camera is captured, for example. The virtual viewpoint video generation unit 104 controls the image quality of the virtual viewpoint video by changing the voxel size of the three-dimensional model in accordance with the target image quality, and by changing the amount of the multi-viewpoint video used as a texture. The virtual viewpoint video generation unit 104 outputs the generated virtual viewpoint video to the video switching apparatus 30.

The actual camera information acquisition unit 105 acquires information relating to the actual camera from the actual camera 20 and outputs the information to the virtual camera control unit 106. Here, an actual camera parameter is information including at least parameters relating to the position and posture of the actual camera. The actual camera parameter may further include a parameter relating to the angle of view.

The virtual camera control unit 106 controls a behavior of the virtual camera in a switching interval on the basis of the actual camera parameter acquired from the actual camera information acquisition unit 105, and the virtual camera parameter, the switching request notification, and the switching execution notification acquired from the virtual camera manipulation unit 102. Here, the switching interval is an interval from when the switching request notification is received and until the automatic manipulation mode is turned off.

The virtual camera control unit 106 outputs the control result to the virtual camera path generation unit 103 as a virtual camera parameter. The virtual camera control unit 106 outputs the on/off information of the automatic manipulation mode to the virtual camera path generation unit 103. The virtual camera control unit 106 determines the target image quality of the virtual viewpoint video at the time of switching on the basis of the actual camera parameter and the virtual camera parameter, and outputs information on the target image quality to the virtual viewpoint video generation unit 104. Details of the control of the virtual camera control unit 106 will be described later.

The actual camera 20 is a broadcast station camera or the like disposed on a side of a sports field or the like, and the position, posture, and/or angle of view of the actual camera is controlled by the actual camera operator. The video captured by the actual camera 20 is output to the video switching apparatus 30. The actual camera 20 includes a measurement device such as a GPS receiver and a gyro sensor, and identifies the position and/or posture of the actual camera. In addition, the actual camera 20 identifies the angle of view of the actual camera from the zoom state. The actual camera 20 outputs the actual camera position, posture, and/or angle of view to the actual camera information acquisition unit 105 as actual camera parameters. A plurality of the actual cameras 20 may be present as long as the actual cameras 20 can be distinguished from one another.

The video switching apparatus 30 selects one video that should be output from among a plurality of videos including at least the virtual viewpoint video acquired from the virtual viewpoint video generation unit 104 and the actual camera video acquired from the actual camera 20. Then, the selected video is output to a broadcasting facility, a distribution server, a display apparatus, and the like, which are not illustrated. Here, the selection of the video is performed by a switcher who has received an instruction from a director or the like via a headset or the like.

The camera group 40 is a group of cameras composed of a plurality of cameras installed to surround a sports field or the like. The camera group 40 is a camera group different from the actual camera 20, and captures a multi-viewpoint video for generating a virtual viewpoint video. Each video captured by each camera constituting the camera group 40 is input to the multi-viewpoint video acquisition unit 101. Note that the actual camera 20 may be one of the plurality of cameras constituting the camera group 40.

Figure 1B:
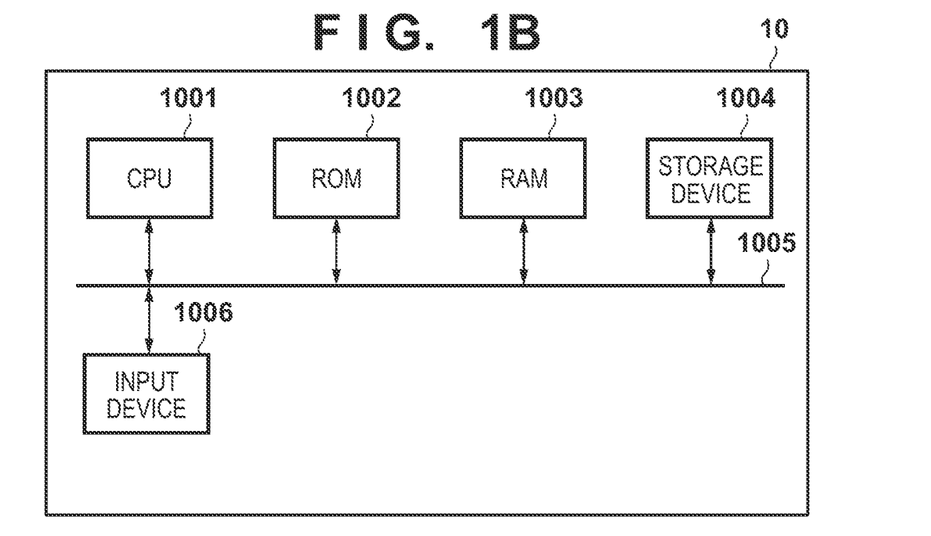
FIG. 1B illustrates an exemplary hardware configuration of an information processing apparatus.

Hardware Configuration of Information Processing Apparatus Next, an exemplary hardware configuration of the information processing apparatus 10 according to the present embodiment is described with reference to FIG. 1B. The information processing apparatus 10 includes a CPU 1001, a ROM 1002, a RAM 1003, a storage device 1004, a bus 1005, and an input device 1006.

The CPU 1001 controls various operations of the above-mentioned functional blocks of the information processing apparatus 10 according to the present embodiment. Details of the control are instructed by a program on the ROM 1002 and the RAM 1003 described later. The CPU 1001 may also operate a plurality of computer programs in parallel. The ROM 1002 stores computer programs storing a procedure for control by the CPU 1001 and data. The RAM 1003 stores control programs for processes performed by the CPU 1001, and provides work areas for various data for the CPU 1001 to execute various controls. The functions of program codes stored in the recording medium such as the ROM 1002 and the RAM 1003 are achieved when read and executed by the CPU 1001, but the type of the recording medium is not limited.

The storage device 1004 is capable of storing various data and the like. The storage device 1004 includes a recording medium such as a hard disk, a floppy disk, an optical disk, a magnetic disk, a magneto-optical disk, a magnetic tape, and a non-volatile memory card, and a drive for driving the recording medium to record information. The stored computer program and data are loaded into the RAM 1003 when necessary by an instruction from a keyboard or the like and/or by an instruction from various computer programs.

The bus 1005 is a data bus or the like connected with each component, and is intended for achieving communication between the components to exchange information at a high speed. The input device 1006 provides various input environments for the user. While a keyboard, a mouse, and the like are conceivable as means for providing various input operating environments, a touch panel, a stylus, and the like may also be used.

Processes

Figure 2A:
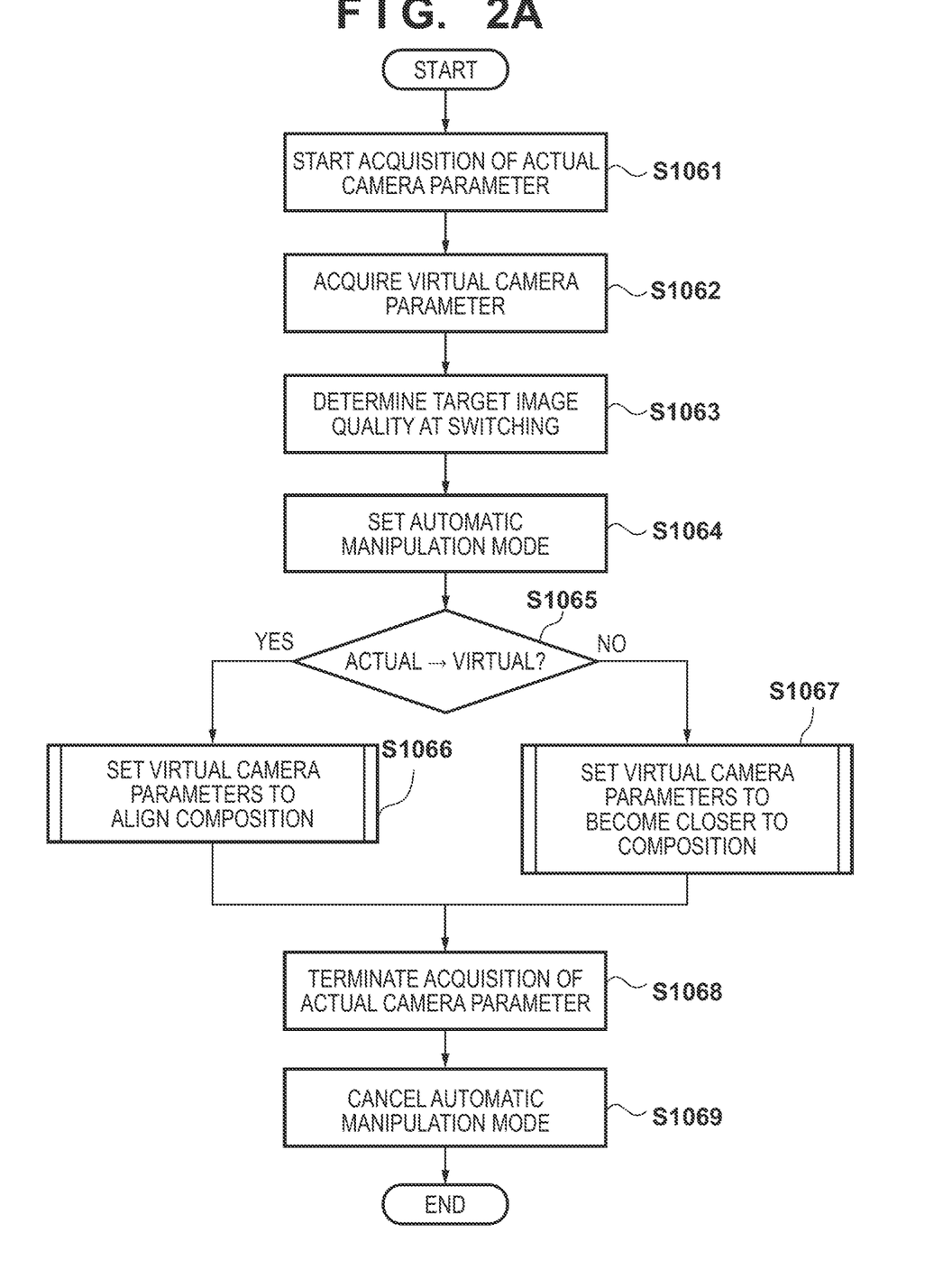
FIGS. 2A to 2C are flowcharts illustrating a processing procedure of a switching interval control according to the first embodiment.

Next, a processing procedure of a switching interval control performed by the virtual camera control unit 106 of the information processing apparatus 10 according to the present embodiment is described with reference to the flowchart of FIG. 2A. When receiving a switching request notification from the virtual camera manipulation unit 102, the virtual camera control unit 106 starts the switching interval control process.

At S1061, the virtual camera control unit 106 starts acquisition of an actual camera parameter including parameters relating to the position, posture and angle of view of the actual camera acquired by the actual camera information acquisition unit 105 from the actual camera 20. The actual camera parameter may be continuously and periodically acquired from the actual camera information acquisition unit 105, or may be acquired only at an update by adopting a configuration in which the actual camera information acquisition unit 105 notifies the virtual camera control unit 106 of updates of the actual camera parameter. Further, in a case where a plurality of the actual cameras 20 are provided, the actual camera ID may be included in the switching request notification such that a specific actual camera can be selected in switching from the virtual camera to the actual camera. It is also possible to adopt a configuration in which the actual camera closest to the virtual camera is identified.

At S1062, the virtual camera control unit 106 acquires a virtual camera parameter including parameters relating to the position, posture, and angle of view of the virtual camera at the time when a switching operation is detected. The virtual camera control unit 106 acquires the current virtual camera parameter determined by manipulation in accordance with the virtual camera manipulation unit 102 from the virtual camera manipulation unit 102.

At S1063, the virtual camera control unit 106 determines the target image quality of the virtual camera at the time of switching on the basis of the actual camera parameter and the virtual camera parameter. Details of the target image quality determination process performed by the virtual camera control unit 106 will be described later with reference to FIGS. 4A to 4C. Note that the processing order of S1061 and S1062 is not limited as long as S1061 and S1062 are performed before the process of S1063. In addition, in a case where the image quality difference between the actual camera video and the virtual camera video is smaller than a predetermined value, the process of S1063 may be omitted. In a case where the image quality difference between the actual camera video and the virtual camera video is equal to or greater than a predetermined value, a non-switchable message may be displayed on a touch panel or the like so that such a fact can be transmitted to the director and/or the actual camera operator from the virtual camera operator.

At S1064, the virtual camera control unit 106 turns on the automatic manipulation mode, and outputs, to the virtual camera path generation unit 103, information indicating that the automatic manipulation mode is on. The virtual camera control unit 106 also outputs the information indicating that the automatic manipulation mode is on to the virtual camera manipulation unit 102. The virtual camera manipulation unit 102 may display an icon on a touch panel screen or the like so that the virtual camera operator can recognize that the mode has become the automatic manipulation mode.

At S1065, the virtual camera control unit 106 determines whether the video switching is from the actual camera video to the virtual camera video on the basis of the switching request notification received from the virtual camera manipulation unit 102. When the switching is from the actual camera video to the virtual camera video, the process proceeds to S1066. When the switching is from the virtual camera video to the actual camera video, the process proceeds to S1067.

At S1066, the virtual camera control unit 106 sets the virtual camera parameters after the switching operation so as to align the virtual camera composition with the actual camera composition. Details of the process of S1066 will be described later with reference to FIG. 2B. At S1067, the virtual camera control unit 106 sets the virtual camera parameters after the switching operation such that the virtual camera composition becomes closer to the actual camera composition. Details of the process of S1067 will be described later with reference to FIG. 2C. At S1068, the virtual camera control unit 106 terminates the acquisition of the actual camera parameter.

At S1069, the virtual camera control unit 106 turns off the automatic manipulation mode, and outputs, to the virtual camera path generation unit 103, information indicating that the automatic manipulation mode is off. The virtual camera control unit 106 also outputs the information indicating that the automatic manipulation mode is off to the virtual camera manipulation unit 102. The virtual camera manipulation unit 102 may display an icon on a touch panel screen or the like such that the virtual camera operator can recognize that the automatic manipulation mode has been canceled. Thus, the switching interval control process is terminated.

Overview of Switching Interval Control Process

Figure 3A:
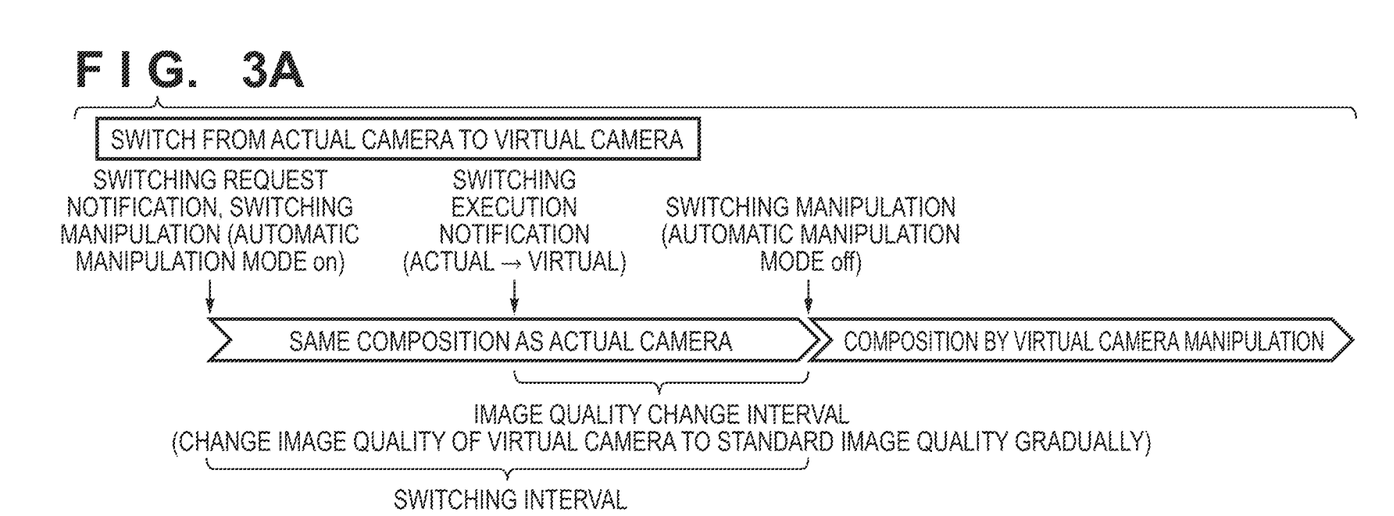
FIGS. 3A and 3B are explanatory diagrams of an overview of processes of the switching interval control according to the first embodiment.

FIGS. 3A and 3B are diagrams illustrating an overview of a switching interval control process performed by the virtual camera control unit 106. When a switching request is notified from the virtual camera manipulation unit 102 to the virtual camera control unit 106 in the case where the actual camera video is selected by the video switching apparatus 30, the video is switched from the actual camera video to the virtual camera video. An overview of the switching process from the actual camera video to the virtual camera video is as illustrated in FIG. 3A.

As illustrated in FIG. 3A, when receiving a switching request for switching from the actual camera video to the virtual camera video, the virtual camera control unit 106 turns on the automatic manipulation mode to set the composition and image quality of the virtual camera to the composition and image quality identical to those of the actual camera, and waits for a switching execution notification. Thus, deviation of the composition and image quality can be prevented at the time of switching from the actual camera video to the virtual camera video. When receiving a switching execution notification from the actual camera video to the virtual camera video, the virtual camera control unit 106 gradually changes the image quality of the virtual camera from the image quality of the actual camera video to a standard image quality, which is a predetermined image quality suitable for the virtual camera work, and turns off the automatic manipulation mode at the time point when the image quality becomes the standard image quality. The position and posture of the virtual viewpoint after the automatic manipulation mode is turned off are controlled based on an input corresponding to a manipulation performed by the operator. Thus, the virtual camera video after switching from the actual camera video to the virtual camera video can be set to an image quality suitable for the virtual camera work.

When a switching request is notified from the virtual camera manipulation unit 102 to the virtual camera control unit 106 in the case where the virtual camera video is selected by the video switching apparatus 30, the video is switched from the virtual camera video to the actual camera video. An overview of the switching process from the virtual camera video to the actual camera video is as illustrated in FIG. 3B.

Figure 3B:
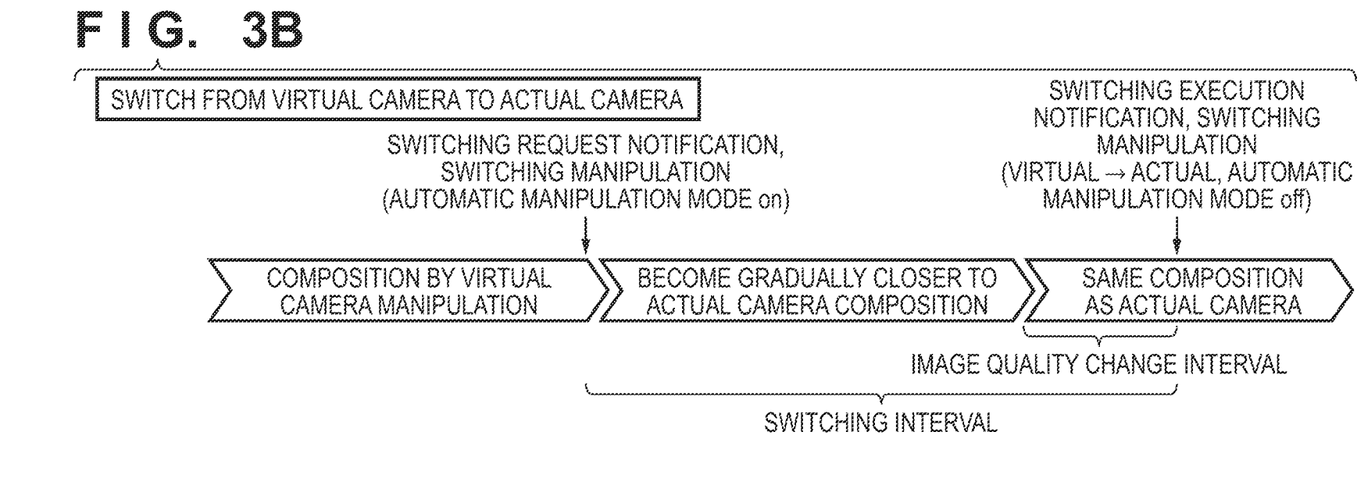

As illustrated in FIG. 3B, when receiving a switching request for switching from the virtual camera video to the actual camera video, the virtual camera control unit 106 turns on the automatic manipulation mode such that the virtual camera composition becomes gradually closer to the actual camera composition. After the composition has become close, the image quality of the virtual camera is gradually brought closer to the image quality of the actual camera, and it waits for a switching execution notification. Thus, deviation of the composition and image quality can be prevented at the time of switching from the virtual camera video to the actual camera video. When receiving a switching notification from the virtual camera video to the actual camera video, the virtual camera control unit 106 turns off the automatic manipulation mode.

Overview of Target Image Quality Determination Process

Figure 4A:
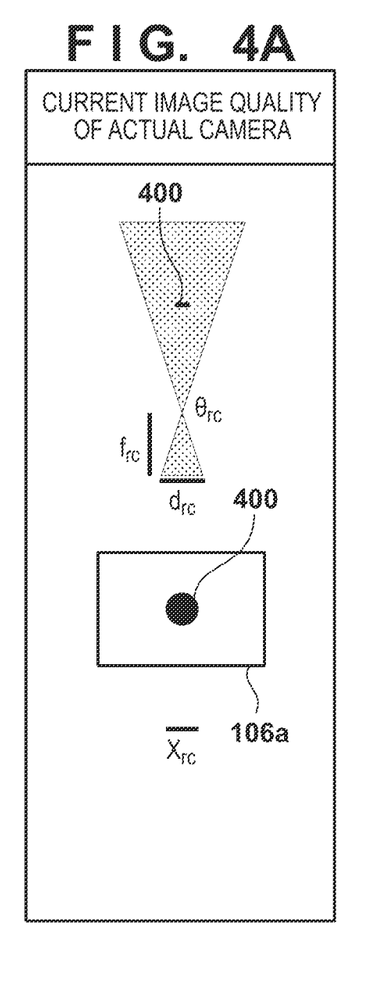
FIGS. 4A to 4C are explanatory diagrams of target image quality determination according to the first embodiment.
Figure 4B:
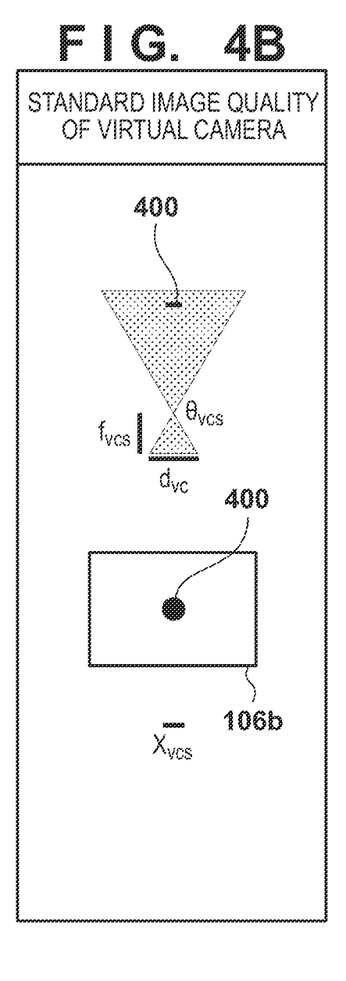
Figure 4C:
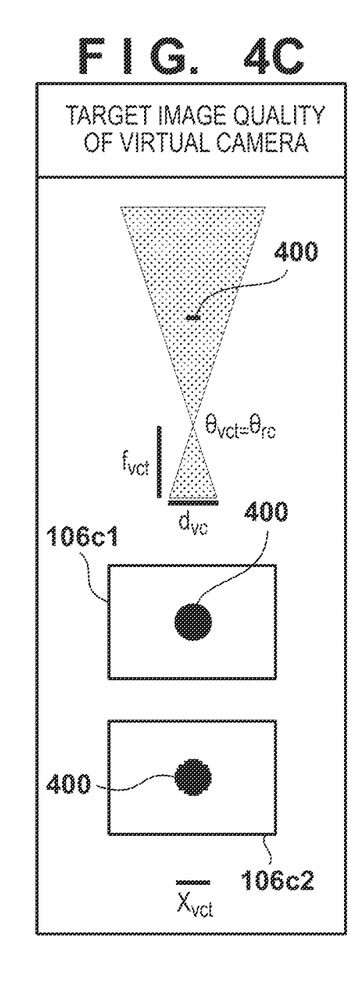

Next, FIGS. 4A to 4C are diagrams illustrating a target image quality determination process performed by the virtual camera control unit 106. FIG. 4A is an actual camera parameter relating to current image quality of an actual camera. FIG. 4B is a camera parameter relating to standard image quality of a virtual camera when an automatic manipulation mode is off. FIG. 4C is a camera parameter relating to target image quality of a virtual camera at the time of switching.

In FIG. 4A, $\theta_{rc}$ is the angle of view of the actual camera and $d_{rc}$ represents the image sensor size of the actual camera. $f_{rc}$ is the focal length of the actual camera, and $x_{rc}$ is the display size that is obtained when a reference subject 400 of a size X separated from the actual camera by a reference distance Z is captured at the angle of view $\theta_{rc}$.

Likewise, in FIG. 4B, $\theta_{vcs}$ is the angle of view of the virtual camera, and $d_{vc}$ represents the image sensor size of the virtual camera. $f_{vcs}$ is the focal length of the virtual camera, and $x_{vcs}$ is the display size that is obtained when the reference object 400 of the size X separated from the virtual camera by the reference distance Z is captured at the angle of view $\theta_{vcs}$.

Likewise, in FIG. 4C, $\theta_{vct}$ is an angle of view of the virtual camera, and $d_{vc}$ represents the image sensor size of the virtual camera. $f_{vct}$ is the focal length of the virtual camera, and $x_{vct}$ is the display size that is obtained when the reference object 400 of the size X separated from the virtual camera by the reference distance Z is captured at the angle of view $\theta_{vct}$.

The virtual camera control unit 106 determines the target image quality of the virtual camera at the time of switching illustrated in FIG. 4C on the basis of the actual camera parameter illustrated in FIG. 4A and the virtual camera parameter of the virtual camera illustrated in FIG. 4B. As illustrated in FIG. 4C, when $\theta_{vct}=\theta_{rc}$ holds, the compositions of the actual camera and the virtual camera are aligned. The angle of view of the virtual camera may be set by directly designating the angle of view $\theta_{vct}$, or may be set by indirectly designating, from Equation (1), the focal length $f_{vct}$ that sets the angle of view $\theta_{vct}$.

$$f_{vct}=d_{vc}/2\ \tan(\theta_{vct}/2) \qquad (1)$$

As indicated in 106a in FIG. 4A, the image quality of the actual camera is set to $x_{rc}/x_{rmin}$ on the basis of the display size $x_{rc}$ obtained when the reference object 400 of the size X separated from the actual camera by the reference distance Z is captured at the angle of view $\theta_{rc}$, and the minimum display size $x_{rmin}$ in the actual camera. As indicated in 106c and 106c2 in FIG. 4C, the image quality of the virtual camera is set to $x_{vct}/x_{vmin}$ on the basis of the display size $x_{vct}$ obtained when the reference object 400 of the size X separated from the virtual camera by the reference distance Z is captured at the angle of view $\theta_{rc}$, and the minimum display size $x_{vmin}$ in the virtual camera. As a result, when the image quality of the virtual camera is equivalent to the actual camera image quality as 106c1 indicated in FIG. 4C, the determination of the target image quality may be omitted. When the image quality of the virtual camera is lower than the actual camera image quality as 106c2 indicated in FIG. 4C, the virtual camera image quality equivalent to the actual camera image quality can be achieved by outputting information on the determined target image quality to the virtual viewpoint video generation unit 104. Since it suffices that the target image quality of the virtual camera at the time of switching is equivalent to the image quality of the actual camera, the target image quality of the virtual camera at the time of switching is determined by determining the minimum c that satisfies $x_{rc}/x_{rmin} \geq c (x_{vct}/x_{vmin})$. Note that in the case of $x_{rc}/x_{rmin} < x_{vct}/x_{vmin}$, the target image quality may be determined as $x_{vct}/x_{vmin}$, or the target image quality may not be set as unswitchable.

Details of Process at S1066

Figure 2B:
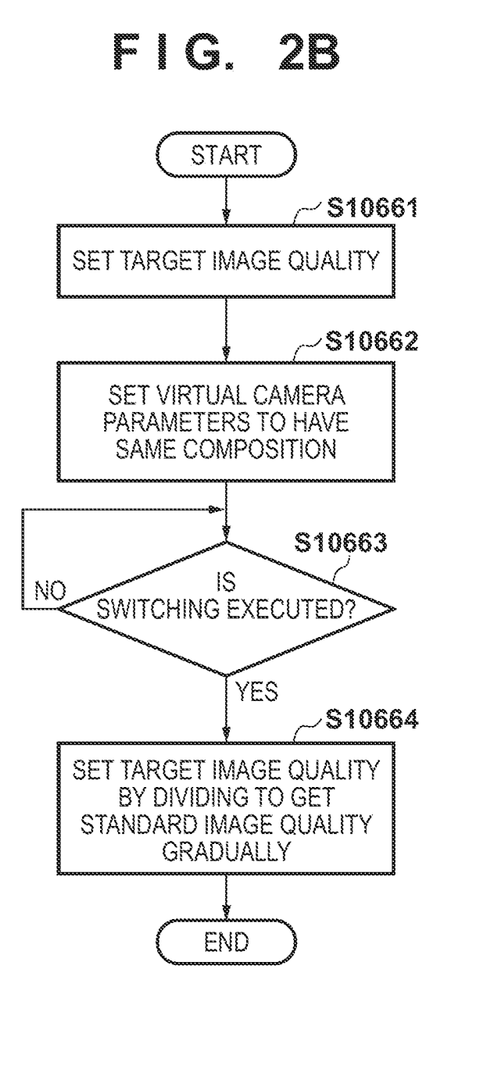

A detailed procedure of the virtual camera parameter setting process (S1066 in FIG. 2A) at the time when the virtual camera control unit 106 switches the video from the actual camera video to the virtual camera video is described with reference to the flowchart of FIG. 2B.

At S10661, the virtual camera control unit 106 outputs, to the virtual viewpoint video generation unit 104, information on the target image quality of the virtual camera at the time of switching to set the target image quality. Note that when the process of S1063 is omitted, the process of S10661 is also omitted.

At S10662, the virtual camera control unit 106 outputs, to the virtual camera path generation unit 103, the actual camera parameters including the parameter relating to the position, posture, and angle of view of the actual camera as the virtual camera parameters to set virtual camera parameters having the same composition. As a result of the process of S10662, the virtual camera parameters generated by the virtual camera path generation unit 103 set the same position, posture, and angle of view as those of the actual camera, and thus the composition of the actual camera before switching and the composition of the virtual camera after switching are aligned. Note that in the case where the angle of view matches from the beginning, it suffices to control such that the parameters relating to at least the position and posture match.

At S10663, the virtual camera control unit 106 determines whether a switching execution notification is received from the virtual camera manipulation unit 102. When the switching execution notification is received, the process proceeds to S10664. When the switching execution notification is not received, it waits until the notification is received.

At S10664, the virtual camera control unit 106 outputs information on the standard image quality, which is the target image quality of the virtual camera after switching, to the virtual viewpoint video generation unit 104. When the difference between the virtual camera image quality at the time of switching and the virtual camera image quality after switching is equal to or greater than a predetermined value, the target image quality is divided into multiple portions such that the image quality changes gradually from the target image quality at the time of switching to the standard image quality after switching. Thus, the information on the target image quality is configured to be output to the virtual viewpoint video generation unit 104 in multiple times. As a result, sudden changes in image quality can be reduced, and switching with less unpleasantness can be achieved. Note that when the process of S1063 is omitted, the process of S10664 is also omitted. Thus, the virtual camera parameter setting process at the time of switching from the actual camera video to the virtual camera video is terminated.

Details of Process of S1067

Figure 2C:
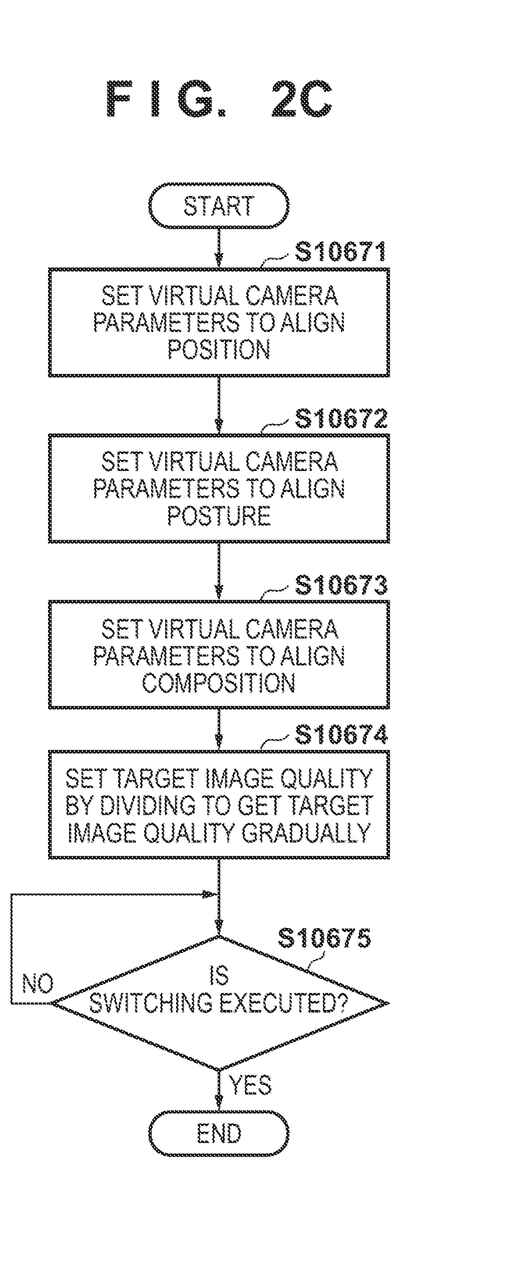

A detailed procedure of the virtual camera parameter setting process (S1067 in FIG. 2A) at the time when the virtual camera control unit 106 switches the video from the virtual camera video to the actual camera video is described with reference to the flowchart of FIG. 2C.

At S10671, the virtual camera control unit 106 sets the virtual camera parameters such that the position of the virtual camera is aligned with the position of the actual camera on the basis of the actual camera parameter. When the deviation between the position of the virtual camera and the position of the actual camera is equal to or greater than a predetermined value, a plurality of virtual camera parameters for gradually changing the position from the virtual camera position to the actual camera position are determined, and output to the virtual camera path generation unit 103.

At S10672, the virtual camera control unit 106 sets the virtual camera parameters such that that the posture of the virtual camera is aligned with the posture of the actual camera on the basis of the actual camera parameter. When the deviation between the posture of the virtual camera and the posture of the actual camera is equal to or greater than a predetermined value, a plurality of virtual camera parameters for gradually changing the posture from the virtual camera posture to the actual camera posture are determined, and output to the virtual camera path generation unit 103.

At S10673, the virtual camera control unit 106 sets the virtual camera parameter such that the angle of view of the virtual camera is aligned with the angle of view of the actual camera on the basis of the actual camera parameter. When the difference between the angle of view of the virtual camera and the angle of view of the actual camera is equal to or greater than a predetermined value, a plurality of virtual camera parameters for gradually changing the angle of view from the angle of view of the virtual camera to the angle of view of the actual camera are determined, and output to the virtual camera path generation unit 103.

Note that the position adjustment, the posture adjustment, and the angle of view adjustment may be performed in an order different from that of the present embodiment. Two adjustments, e.g., the position adjustment and the angle of view adjustment, may be collectively performed, or the three adjustments may be collectively performed. In addition, in the case where the angle of view matches from the beginning, the parameter relating to the angle of view may not be adjusted, and in this case, it suffices to adjust at least the parameters relating to the position and posture to align the composition.

At S10674, the virtual camera control unit 106 outputs, to the virtual viewpoint video generation unit 104, the target image quality of the virtual camera at the time of switching. When the difference between the virtual camera image quality before switching and the virtual camera image quality at the time of switching is equal to or greater than a predetermined value, the target image quality is divided into multiple portions such that the image quality changes gradually from the standard image quality before switching to the target image quality at the time of switching. Thus, the information on the target image quality is configured to be output to the virtual viewpoint video generation unit 104 multiple times. As a result, sudden changes in image quality can be reduced, and switching with less unpleasantness can be achieved. Note that when the process of S1063 is omitted, the process of S10674 is also omitted.

At S10675, the virtual camera control unit 106 determines whether a switching execution notification is received from the virtual camera manipulation unit 102. When the switching execution notification is received, the process is terminated. When the switching execution notification is not received, it waits until the notification is received. Thus, the virtual camera parameter setting process at the time of switching from the virtual camera video to the actual camera video is terminated.

As described above, in the present embodiment, the virtual camera is automatically controlled such that the composition and image quality of the actual camera and the virtual camera match each other. As a result, the actual camera and the virtual camera can be switched without causing discontinuities in the composition before and after the switching. Accordingly, switching between the actual camera and the virtual camera with reduced unpleasantness is achieved without relying on the skill of the operator of the virtual camera.

An exemplary case in which both the composition and image quality of the virtual camera are controlled is described in the present embodiment, but the image quality of the virtual camera may not be automatically controlled. When the composition is substantially the same, the actual camera and the virtual camera can be switched without causing discontinuities in the composition before and after the switching, and therefore it suffices to control the virtual camera such that at least the composition matches. Controlling the image quality of the virtual camera in addition to the composition of the virtual camera allows for switching between the actual camera and the virtual camera with less unpleasantness.

Second Embodiment

Configurations of Video Processing System and Information Processing Apparatus

Figure 5:
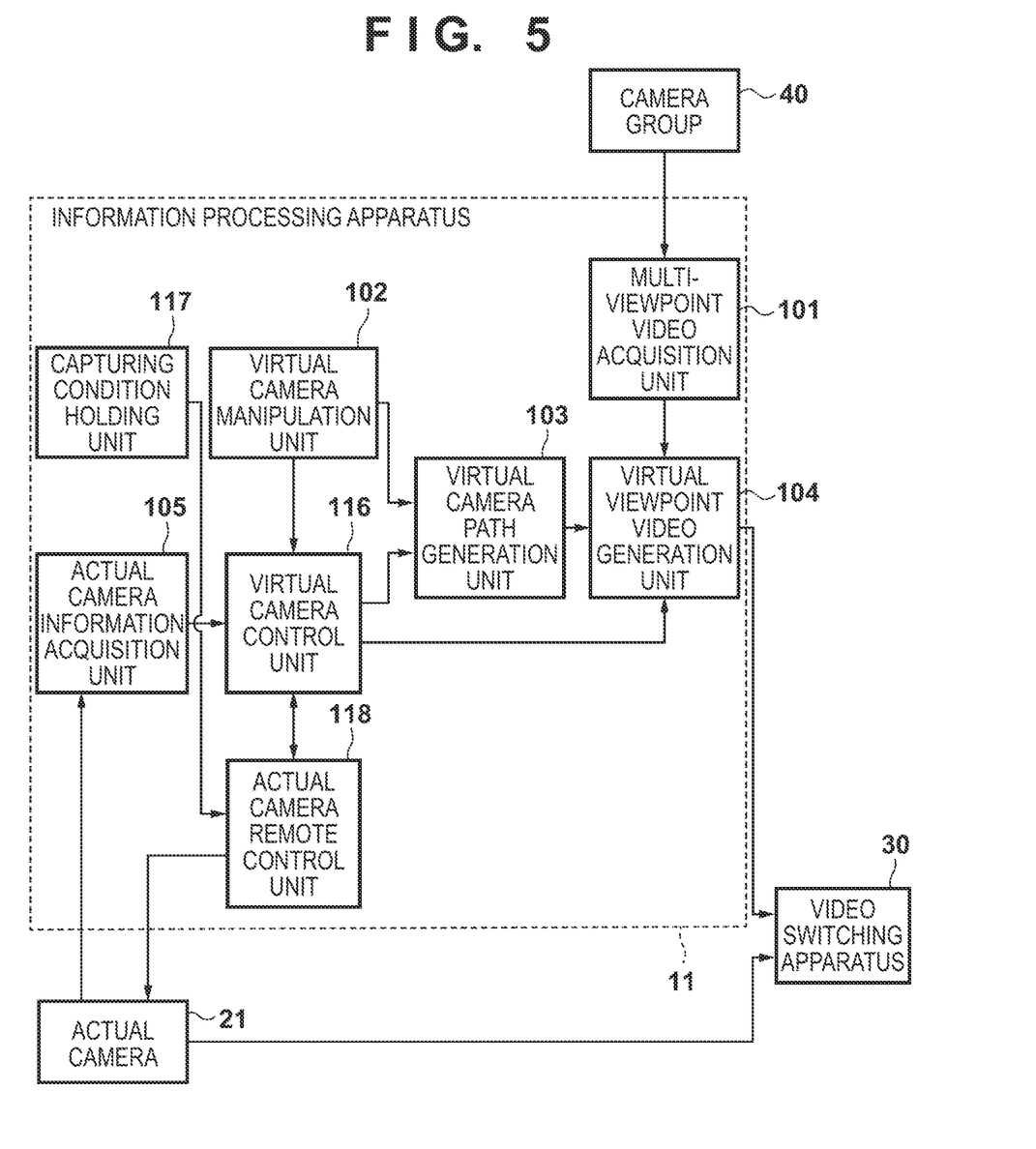
FIG. 5 is an overall configuration diagram of a video processing system according to a second embodiment.

FIG. 5 is an overall configuration diagram of a video processing system according to a second embodiment. The video processing system includes an information processing apparatus 11, an actual camera 21, a video switching apparatus 30, and the camera group 40.

The information processing apparatus 11 includes the multi-viewpoint video acquisition unit 101, the virtual camera manipulation unit 102, the virtual camera path generation unit 103, the virtual viewpoint video generation unit 104, the actual camera information acquisition unit 105, a virtual camera control unit 116, a capturing condition holding unit 117, and an actual camera remote control unit 118.

The multi-viewpoint video acquisition unit 101, the virtual camera manipulation unit 102, the virtual camera path generation unit 103, the virtual viewpoint video generation unit 104, and the actual camera information acquisition unit 105 are the same as those in FIG. 1A, and therefore descriptions thereof will be omitted.

The virtual camera control unit 116 controls the behavior of the virtual camera on the basis of the actual camera parameter acquired from the actual camera information acquisition unit 105, the virtual camera parameter, the switching request notification and the switching execution notification acquired from the virtual camera manipulation unit 102, and the remote control completion notification output from the actual camera remote control unit 118. The virtual camera control unit 116 outputs a virtual camera parameter, which is the control result, and on/off information of the automatic manipulation mode to the virtual camera path generation unit 103.

The virtual camera control unit 116 determines the target image quality of the virtual viewpoint video at the time of switching, and outputs the target image quality to the virtual viewpoint video generation unit 104. The virtual camera control unit 116 provides a remote control instruction of the actual camera video capturing unit 21 to the actual camera remote control unit 118. The virtual camera control unit 116 outputs, to the actual camera remote control unit 118, the actual camera parameter and information for specifying whether the switching direction is from the actual camera to the virtual camera, or from the virtual camera to the actual camera. The virtual camera control unit 116 outputs a switching interval control completion notification to the actual camera remote control unit 118.

The capturing condition holding unit 117 holds a capturing condition of the virtual camera. Here, the capturing condition includes at least a capturing range of the virtual camera. The capturing range may be divided into a plurality of capturing ranges of different image quality, such as a capturing range A of image quality A and a capturing range B of image quality B. The capturing condition holding unit 117 outputs the capturing condition of the virtual camera to the actual camera remote control unit 118.

The actual camera remote control unit 118 performs remote control of the actual camera on the basis of the remote control instruction and the actual camera parameter output from the virtual camera control unit 116 and the virtual camera capturing condition output from the capturing condition holding unit 117. Here, the remote control is the control of at least one of the posture and angle of view of the actual camera. The remote control may be direct control via a panhead or the like mounted in the actual camera 21, or may be indirect control through an instruction from a director or the like to an actual camera operator. The actual camera remote control unit 118 outputs on/off information of the remote control mode and control information of the actual camera to the actual camera 21. Details of the actual camera remote control unit 118 will be described later.

The actual camera 21 identifies the actual camera parameters relating to the position, posture, and angle of view of the actual camera, and outputs the parameters to the actual camera information acquisition unit 105. The actual camera 21 receives on/off information of the remote control mode and control information from the actual camera remote control unit 118, and operates in accordance with the control information when the remote control mode is on. The actual camera 21 may be equipped with a panhead for externally controlling the posture and/or angle of view of the actual camera so that the actual camera remote control unit 118 can directly perform remote control.

The video switching apparatus 30 and the camera group 40 are the same as those in FIG. 1A, and therefore descriptions thereof will be omitted. Further, the hardware configuration of the information processing apparatus 11 is also similar to that of FIG. 1B, and therefore descriptions thereof will be omitted.

Overview of Switching Interval Control Process

Figure 6A:
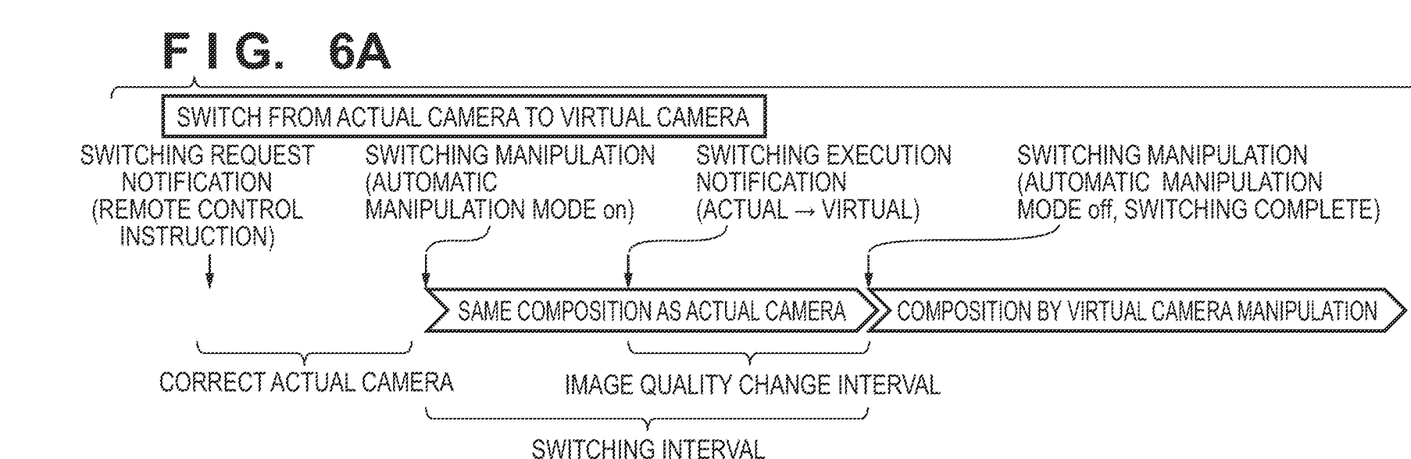
FIGS. 6A to 6B are explanatory diagrams of an overview of processes of the switching interval control according to the second embodiment.

Here, FIGS. 6A and 6B are diagrams illustrating an overview of the switching interval control process performed by the virtual camera control unit 116. When a switching request is notified from the virtual camera manipulation unit 102 to the virtual camera control unit 116 in the case where the actual camera video is selected by the video switching apparatus 30, the video is switched from the actual camera video to the virtual camera video. An overview of the switching process from the actual camera video to the virtual camera video is as illustrated in FIG. 6A.

As illustrated in FIG. 6A, when receiving a switching request notification for switching from the actual camera video to the virtual camera video, the virtual camera control unit 116 outputs a remote control instruction to the actual camera remote control unit 118, and waits for a remote control completion notification from the actual camera remote control unit 118. This makes it possible to avoid a situation in which switching from the actual camera video to the virtual camera video fails due to mismatch between the capturing conditions of the actual camera and the virtual camera.

When receiving a remote control completion notification from the actual camera remote control unit 118, the virtual camera control unit 116 turns on the automatic manipulation mode to set the virtual camera composition to the composition identical to that of the actual camera, and waits for a switching execution notification. Then, when the switching execution notification is received, the automatic manipulation mode is turned off.

When a switching request is notified from the virtual camera manipulation unit 102 to the virtual camera control unit 116 in the case where the virtual camera video is selected by the video switching apparatus 30, the video is switched from the virtual camera video to the actual camera video. An overview of the switching process from the virtual camera video to the actual camera video is as illustrated in FIG. 6B.

Figure 6B:
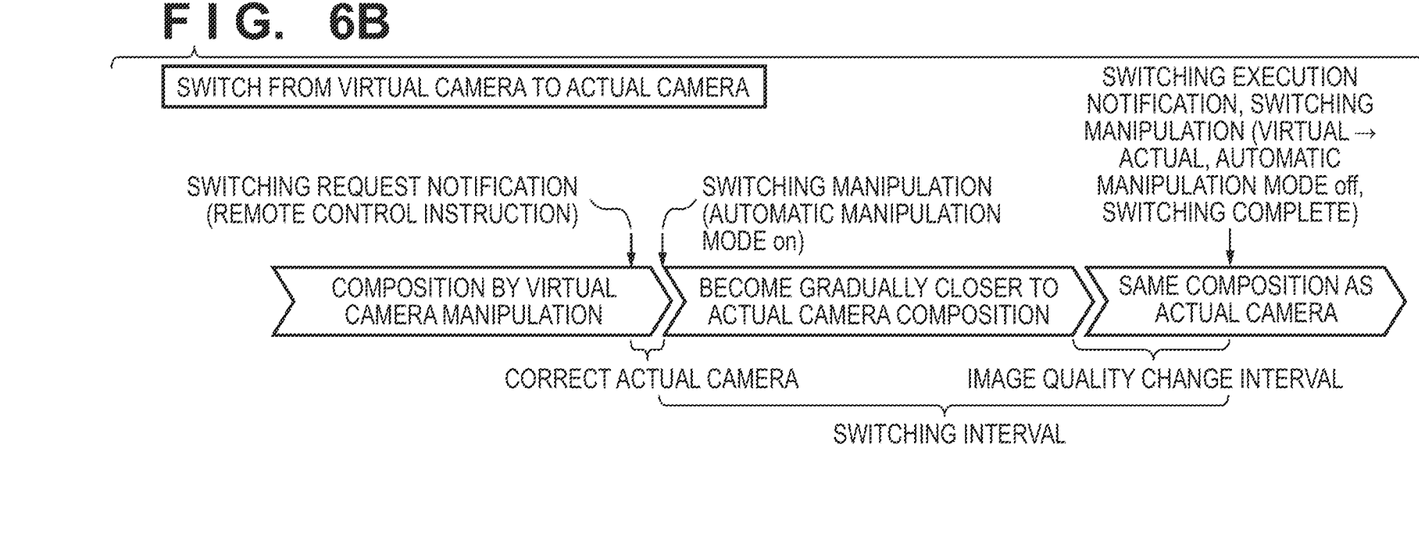

As illustrated in FIG. 6B, when receiving a switching request notification for switching from the virtual camera video to the actual camera video, the virtual camera control unit 116 outputs a remote control instruction to the actual camera remote control unit 118, and waits for a remote control completion notification from the actual camera remote control unit 118. This makes it possible to avoid a situation in which switching from the virtual camera video to the actual camera video fails due to a mismatch between the capturing conditions of the actual camera and the virtual camera. When receiving a remote control completion notification from the actual camera remote control unit 118, the virtual camera control unit 116 turns on the automatic manipulation mode so as to gradually bring the image quality of the virtual camera closer to the image quality of the actual camera after gradually bringing the composition of the virtual camera closer to the composition of the actual camera, and waits for a switching execution notification. Then, when the switching execution notification is received, the automatic manipulation mode is turned off.

Processes

Figure 7A:
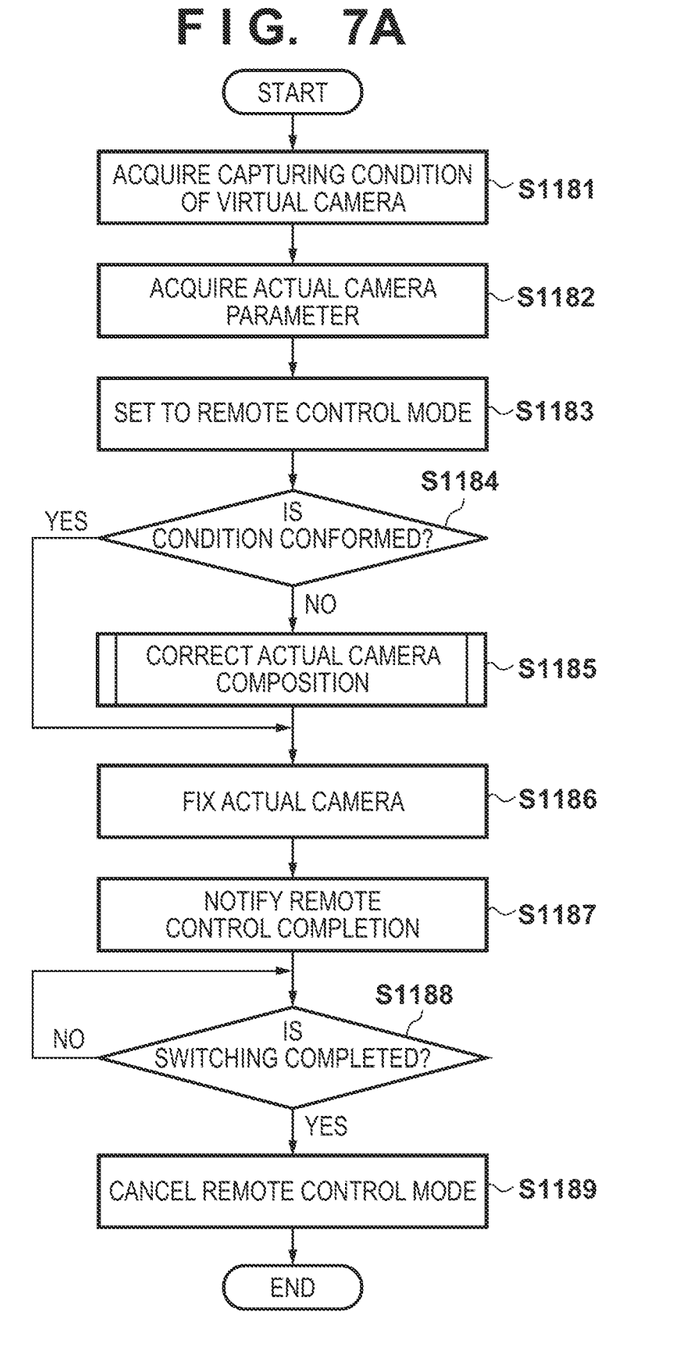
FIGS. 7A and 7B are flowcharts illustrating a processing procedure of an actual camera remote control according to the second embodiment.

Next, a processing procedure of the actual camera remote control performed by the actual camera remote control unit 118 of the information processing apparatus 10 according to the present embodiment is described with reference to the flowchart of FIG. 7A. When receiving a remote control instruction from the virtual camera control unit 116, the actual camera remote control unit 118 starts a remote control process.

At S1181, the actual camera remote control unit 118 acquires a capturing condition including the capturing range of the virtual camera from the capturing condition holding unit 117. At S1182, the actual camera remote control unit 118 acquires, from the virtual camera control unit 116, an actual camera parameter including at least one of the posture and angle of view of the actual camera 21.

At S1183, the actual camera remote control unit 118 turns on the remote control mode for the actual camera 21. Note that the order of the processes of the S1181, S1182, and S1183 is not limited to the order of the present embodiment. The processes may be performed in other orders, and some processes may be simultaneously performed.

At S1184, the actual camera remote control unit 118 determines whether the actual camera composition identified based on the actual camera parameter conforms with the virtual camera capturing condition. Here, the conformity with the capturing condition can be determined based on whether the posture of the actual camera 21 and the posture of the virtual camera differ by a predetermined angle or greater, and/or whether the angle of view of the actual camera 21 and the angle of view of the virtual camera differ by a predetermined value or greater. When the posture of the actual camera 21 and the posture of the virtual camera largely differ from each other, conformity is not ensured can be determined. In addition, also when the angle of view of the actual camera 21 and the angle of view of the virtual camera largely differ from each other, determination that the conformity is not ensured can be made. While the posture and the angle of view are compared here on the assumption that the actual camera 21 is a broadcasting camera installed in a fixed location and the position of the camera 21 is fixed, the positions thereof may also be compared. When it is determined there is conformity as a result of the determination of S1184, the process proceeds to S1186. When there is no conformity, the process proceeds to S1185.

At S1185, the actual camera remote control unit 118 corrects the actual camera composition. Note that details of the process of S1185 will be described later with reference to FIG. 7B. At S1186, the actual camera remote control unit 118 fixes the actual camera. Specifically, the actual camera remote control unit 118 fixes the actual camera so as to maintain the actual camera composition when the actual camera composition conforms with a virtual camera imaging condition (yes at S1184). In addition, when the actual camera composition does not conform with the virtual camera imaging condition (no at S1184), the actual camera is fixed so as to maintain the actual camera composition corrected at S1185.

At S1187, the actual camera remote control unit 118 outputs an actual camera control completion notification to the virtual camera control unit 116. At S1188, the actual camera remote control unit 118 determines whether a switching interval control completion notification is received from the virtual camera control unit 116. When the switching interval control completion notification is received, the process proceeds to S1189. When the switching interval control completion notification is not received, it waits until the notification is received. At S1189, the actual camera remote control unit 118 turns off the remote control mode for the actual camera 21, and terminates the remote control process.

Details of Process of S1185

Figure 7B:
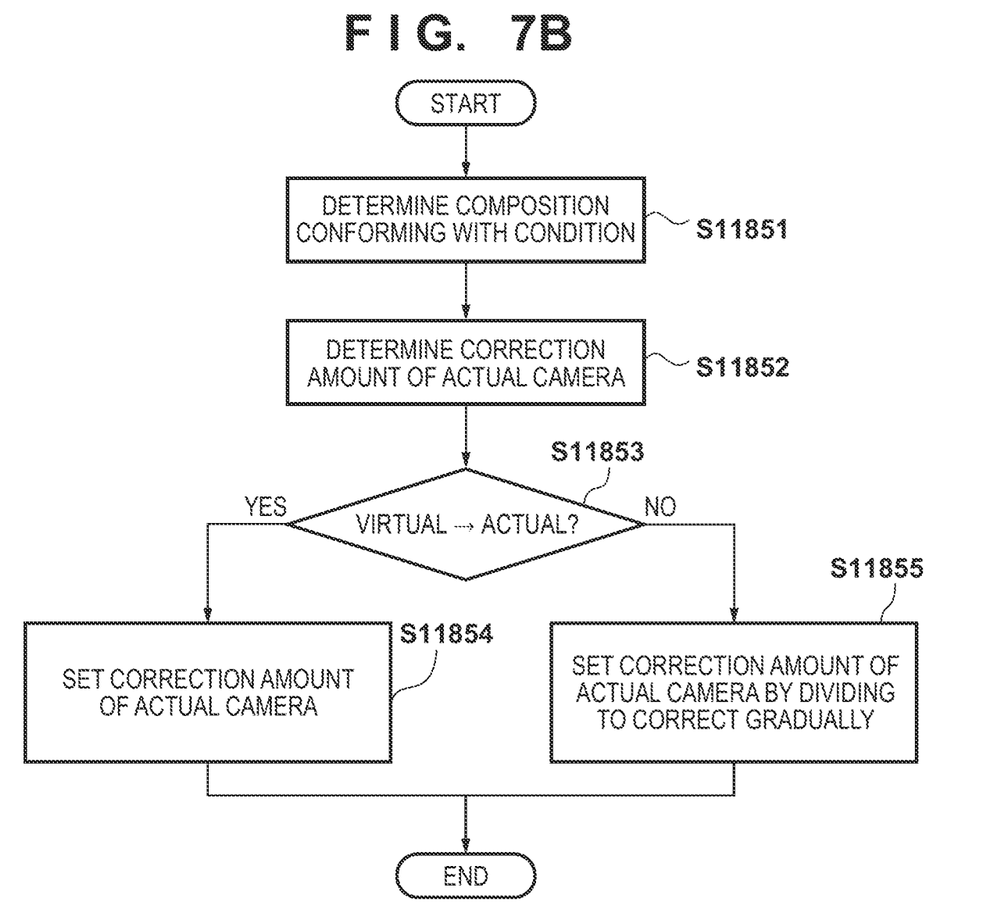

A detailed procedure of the actual camera composition correction process (S1185 in FIG. 7A) performed by the actual camera remote control unit 118 is described with reference to the flowchart of FIG. 7B.

At S11851, the actual camera remote control unit 118 determines the corrected actual camera composition conforming with the condition on the basis of the current actual camera composition before correction and the virtual camera imaging condition. For example, the actual camera composition is determined such that the difference in the posture and/or the angle of view is within a predetermined value of a given posture and/or angle of view. Note that when the difference in the posture and/or the angle of view is excessively large and is equal to or greater than a predetermined acceptable value for example, the switching process between the actual camera and the virtual camera itself may not be performed.

At S11852, the actual camera remote control unit 118 determines the correction amount for the actual camera on the basis of the actual camera composition before correction and the actual camera composition after the correction. At S11853, the actual camera remote control unit 118 determines whether the switching direction is from the virtual camera to the actual camera. When the switching is from the virtual camera to the actual camera, the process proceeds to S11854. When the switching is from the actual camera to the virtual camera, the process proceeds to S11855.

At S11854, the actual camera remote control unit 118 sets the correction amount of the actual camera to the actual camera 21, and terminates the process. In this manner, the current actual camera composition is changed at one time rather than being gradually changed to the actual camera composition after the correction. At S11855, the actual camera remote control unit 118 sets the divided correction amounts of the actual camera to the actual camera 21 multiple times, and terminates the process. Thus, the actual camera composition gradually changes between before and after the correction.

As described above, in the present embodiment, the image capturing range of the actual camera (for example, the parameters relating to the posture and the angle of view) is corrected so as to conform with the capturing condition including the capturing range of the virtual camera, and thereafter the virtual camera is automatically controlled such that the compositions of the actual camera and the virtual camera are aligned. This makes it possible to avoid a situation in which switching from the virtual camera video to the actual camera video fails due to mismatch between the conditions of the actual camera and the virtual camera. Further, the actual camera and the virtual camera are switched without causing discontinuities in the composition before and after the switching. Accordingly, switching between the actual camera and the virtual camera with reduced unpleasantness is achieved without relying on the skill of the operator of the virtual camera.

According to the above-described embodiment, switching between the actual camera and the virtual camera can be effectively performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-170895, filed Sep. 12, 2018, which is hereby incorporated by reference wherein in its entirety.

What is claimed is:

1. An information processing apparatus comprising:
one or more memories storing one or more programs; and
one or more processors that executes the one or more programs including instructions for:
receiving a first request for selecting an image capturing apparatus from among a plurality of image capturing apparatuses;
acquiring information for specifying a position and an orientation of the selected image capturing apparatus based on the first request;
receiving a second request for switching an image displayed on a display screen between a captured image captured by the selected image capturing apparatus and a virtual viewpoint image generated based on a plurality of captured images captured from different directions by a plurality of image capturing apparatuses;
acquiring a viewpoint parameter representing a position of a virtual viewpoint and a direction of view from the virtual viewpoint;
executing, in a case where the second request is received, a control for changing the viewpoint parameter in a time range after the second request is received such that the position of the virtual viewpoint and the position of the selected image capturing apparatus specified by the information gradually match and such that the direction of view from the virtual viewpoint and a capturing direction corresponding to the orientation of the selected image capturing apparatus specified by the information gradually match; and
generating the virtual viewpoint image corresponding to the position of the virtual viewpoint and the direction of view from the virtual viewpoint.

2. The information processing apparatus according to claim 1, wherein:
the one or more programs further include instructions for:
acquiring angle information for specifying an angle of view of the selected image capturing apparatus,
the viewpoint parameter represents an angle of view of the virtual viewpoint, and
in a case where the second request is received, the viewpoint parameter is gradually changed such that the angle of view of the virtual viewpoint and the angle of view of the selected image capturing apparatus specified by the angle information match.

3. The information processing apparatus according to claim 1, wherein the position of the virtual viewpoint and the direction of view from the virtual viewpoint becomes gradually closer to the position and the capturing direction corresponding to the orientation of the selected image capturing apparatus in the time range.

4. The information processing apparatus according to claim 1, wherein, in a case where the second request is received, a process for matching an image quality of the virtual viewpoint image and an image quality of the captured image acquired by the selected image capturing apparatus is further executed.

5. The information processing apparatus according to claim 1, wherein:
the viewpoint parameter representing position of the virtual viewpoint and the direction of view from the virtual viewpoint in a period different from the time range are acquired based on a user operation.

6. The information processing apparatus according to claim 1, wherein, in a case where the second request is received, an image quality of the virtual viewpoint image is controlled to become farther from image quality of the captured image acquired by the selected image capturing apparatus after the viewpoint image is displayed on the display screen.

7. The information processing apparatus according to claim 1, wherein the one or more programs further include instructions for outputting the generated virtual viewpoint image corresponding to another apparatus.

8. The information processing apparatus according to claim 1, wherein the display screen is a screen included in a broadcasting facility or a display apparatus displaying an image obtained from a distribution server.

9. The information processing apparatus according to claim 1, wherein the plurality of image capturing apparatuses, which capture the plurality of captured images for generating the virtual viewpoint image, are different from the selected image capturing apparatus.

10. An information processing method comprising:
receiving a first request for selecting an image capturing apparatus from among a plurality of image capturing apparatuses;
acquiring information for specifying a position and an orientation of the selected image capturing apparatus based on the first request;
receiving a second request for switching an image displayed on a display screen between a captured image captured by the selected image capturing apparatus and a virtual viewpoint image generated based on a plurality of captured images captured from different directions by a plurality of image capturing apparatuses;
acquiring a viewpoint parameter representing a position of a virtual viewpoint and a direction of view from the virtual viewpoint;
executing, in a case where the second request is received, a control for changing the viewpoint parameter in a time range after the second request is received such that the position of the virtual viewpoint and the position of the selected image capturing apparatus specified by the information gradually match and such that the direction of view from the virtual viewpoint and a capturing direction corresponding to the orientation of the selected image capturing apparatus specified by the information gradually match; and
generating the virtual viewpoint image corresponding to the position of the virtual viewpoint and the direction of view from the virtual viewpoint.

11. The information processing method according to claim 10, wherein:
the viewpoint parameter represents an angle of view of the virtual viewpoint, and
the method further comprises:
acquiring angle information for specifying an angle of view of the selected image capturing apparatus; and
in a case where the second request is received, gradually changing the viewpoint parameter such that the angle of view of the virtual viewpoint and the angle of view of the selected image capturing apparatus specified by the angle information match.

12. A non-transitory computer-readable storage medium storing a computer program executable by a computer to execute an information processing method comprising:
receiving a first request for selecting an image capturing apparatus from among a plurality of image capturing apparatuses;
acquiring information for specifying a position and an orientation of the selected image capturing apparatus based on the first request;
receiving a second request for switching an image displayed on a display screen between a captured image captured by the selected image capturing apparatus and a virtual viewpoint image generated based on a plurality of captured images captured from different directions by a plurality of image capturing apparatuses;
acquiring a viewpoint parameter representing a position of a virtual viewpoint and a direction of view from the virtual viewpoint;
executing, in a case where the second request is received, a control for changing the viewpoint parameter in a time range after the second request is received such that the position of the virtual viewpoint and the position of the selected image capturing apparatus specified by the information gradually match and such that the direction of view from the virtual viewpoint and a capturing direction corresponding to the orientation of the selected image capturing apparatus specified by the information gradually match; and
generating the virtual viewpoint image corresponding to the position of the virtual viewpoint and the direction of view from the virtual viewpoint.

13. The information processing apparatus according to claim 1, wherein the one or more programs further include instructions for controlling the position and the orientation of the selected image capturing apparatus based on a user operation.

14. The information processing apparatus according to claim 1, wherein the selected image capturing apparatus for acquiring the captured image is an image capturing apparatus closest to the position of the virtual viewpoint among a plurality of image capturing apparatus.

15. The information processing apparatus according to claim 1, wherein the first request is included in the second request.

* * * * *